US012647741B2

(12) United States Patent
Chen et al.

(10) Patent No.: US 12,647,741 B2
(45) Date of Patent: Jun. 2, 2026

(54) RIBBON SPEAKER

(71) Applicant: SABLE CORPORATION, New Taipei City (TW)

(72) Inventors: Hui-Cheng Chen, New Taipei City (TW); Kuang-Yun Li, New Taipei City (TW); Po-Sheng Chiu, New Taipei City (TW); Ke-Hua Wang, New Taipei City (TW); Pai-Lu Huang, New Taipei City (TW); Hao-Chun Teng, New Taipei City (TW)

(73) Assignee: Sable Corporation, New Taipei City (TW)

( * ) Notice: Subject to any disclaimer, the term of this patent is extended or adjusted under 35 U.S.C. 154(b) by 136 days.

(21) Appl. No.: 18/607,687

(22) Filed: Mar. 18, 2024

(65) Prior Publication Data

US 2025/0133360 A1 Apr. 24, 2025

(30) Foreign Application Priority Data

Oct. 20, 2023 (TW) ................................ 112211313

(51) Int. Cl.
*H04R 7/04* (2006.01)
*H04R 1/02* (2006.01)
*H04R 9/02* (2006.01)
*H04R 9/04* (2006.01)
*H04R 9/06* (2006.01)
*H04R 31/00* (2006.01)

(52) U.S. Cl.
CPC ........... *H04R 31/006* (2013.01); *H04R 1/025* (2013.01); *H04R 7/04* (2013.01); *H04R 9/025* (2013.01); *H04R 9/047* (2013.01); *H04R 9/06* (2013.01)

(58) Field of Classification Search
CPC ........ H04R 31/006; H04R 1/025; H04R 7/04; H04R 9/025; H04R 9/047; H04R 9/06
USPC .......................................................... 381/399
See application file for complete search history.

(56) References Cited

U.S. PATENT DOCUMENTS 4,837,838 A * 6/1989 Thigpen ................ H04R 9/047 181/173
5,021,613 A * 6/1991 Garcia .................. H04R 9/048 381/399

(Continued)

*Primary Examiner* — Suhan Ni
(74) *Attorney, Agent, or Firm* — Rosenberg, Klein & Lee

(57) ABSTRACT

A ribbon speaker includes a housing, first and second magnet assemblies, a ribbon diaphragm, a coil, and a flexible substrate. The first and second magnet assemblies is arranged in the housing. The same poles of the first magnet assembly and the second magnet assembly are arranged opposite to each other. The diaphragm is positioned between these magnet assemblies. The coil, placed on this diaphragm, includes two first connection portions. The flexible substrate includes a body, two connection portions, and two soldering portions. The body's first part is inside the housing, while the second part arranged outside. The second connections on the body's first part electrically connected to the coil's first connections. The externally positioned soldering portions facilitate easier assembly, significantly reducing soldering complexity. The soldering portions are respectively and electrically connected to the second connection portions. This improvement ensures the ribbon speaker is more accurately and more rapidly produced.

7 Claims, 9 Drawing Sheets

(56) References Cited

U.S. PATENT DOCUMENTS

| | | | | |
|---|---|---|---|---|
| 6,600,399 B1 * | 7/2003 | Trandafir | H02K 35/04 | 335/299 |
| 8,131,002 B2 * | 3/2012 | Takewa | H04R 11/02 | 381/399 |
| 2007/0098207 A1 * | 5/2007 | Lin | H04R 7/06 | 381/399 |
| 2018/0084346 A1 * | 3/2018 | Yang | H04R 7/18 | |
| 2018/0098156 A1 * | 4/2018 | Jacques | H04R 9/047 | |

* cited by examiner

RIBBON SPEAKER

BACKGROUND OF THE INVENTION

This application claims priority for the TW patent application no. 112211313 filed on 20 Oct. 2023, the content of which is incorporated by reference in its entirely.

FIELD OF THE INVENTION

The present invention pertains to speaker technology, particularly to a miniaturized speaker that integrates ribbon speaker and planar magnetic transducer.

DESCRIPTION OF THE RELATED ART

Ribbon speakers are usually used in high-frequency audio. The ribbon speaker produces sound by vibrating a thin and light ribbon. The ribbon is usually made of aluminum etched and electroplated on a diaphragm. The wires, welded on the ribbon, transmit electrical signals to the ribbon through the wires. When the current passes through the ribbon, the ribbon will be affected by the magnetic field, causing the ribbon to vibrate and produce sound.

Ribbon speakers have some advantages compared to a traditional moving coil loudspeaker driver, such as the following:

1. Fast response time: Because the ribbon speaker is light and thin, it can vibrate quickly and respond to electrical signals more quickly. The transient response is superior, making the treble sound effect clearer. No noticeable distortion occurs in the higher frequency range.
2. Lightweight: Because ribbon speakers are light and thin, ribbon speakers are lighter, easier to install and easier to move compared to traditional cone speakers.
3. High efficiency: The efficiency has a range of 4~5 decibels (dB) higher than the efficiency of the traditional moving coil loudspeaker driver. Thus, the power consumption is relatively low.
4. Good high frequency response: The frequency bandwidth is as high as 40 KHz or more.

Furthermore, the detailed mechanism through which ribbon speakers produce sound is pivotal to understanding their advantages and the potential for innovation. In a ribbon speaker, a paper-thin metal foil ribbon is suspended within a magnetic field, positioned between the poles of at least one pair of permanent magnets. The audio voltage signal drives the ribbon, causing a current to flow through it. This current generates a magnetic field that interacts with the permanent magnets (stationary magnets), producing sound that corresponds to the applied waveform. This process highlights the efficiency and precision of sound production in ribbon speakers, emphasizing the importance of the ribbon's material and structural design in achieving high-quality audio output.

Accordingly, under the premise of taking lightweight and low power consumption (such as increasing the battery life of personal devices) as the advantages and development goals, reducing the ribbon area of ribbon speakers will help the technical field shift from home audio to applications of small terminal devices (e.g., miniaturization). However, the soldering difficulty in the manufacturing process of ribbon speakers is relatively high.

Therefore, how to reduce the difficulty of soldering during the manufacturing process of miniaturized ribbon speakers and how to produce the ribbon speakers more accurately and quickly have become one of the development goals of the industry.

SUMMARY OF THE INVENTION

The objective of the present invention is to improve the difficulty of soldering of miniaturized ribbon speakers during the manufacturing process and to produce ribbon speakers more accurately and quickly.

The present invention provides a ribbon speaker, which includes a housing, a first magnet assembly, a second magnet assembly, a ribbon diaphragm, a coil, and a flexible substrate. The first magnet assembly is arranged in the housing. The second magnet assembly is arranged in the housing. The same poles of the first magnet assembly and the second magnet assembly are arranged opposite to each other. The ribbon diaphragm is arranged between the first magnet assembly and the second magnet assembly. The coil, formed on the ribbon diaphragm, includes two first connection portions. The flexible substrate includes a body, two second connection portions, and two soldering portions. A first part of the body is arranged inside the housing and a second part of the body is arranged outside the housing. The second connection portions are arranged on the first part of the body. The second connection portions are respectively and electrically connected to the two first connection portions. The soldering portions are arranged on the second part of the body. The soldering portions are respectively and electrically connected to the two second connection portions.

The advantage of the ribbon speaker is that the two soldering portions of the flexible substrate are arranged outside the housing to reduce the soldering difficulty. Thus, the ribbon speaker is more accurately and more rapidly produced.

In some embodiments, the housing includes a first cover and a second cover. The first cover and the second cover are mutually snap-connectable or detachable. The first magnet assembly is arranged on the first cover. The second magnet assembly is arranged on the second cover.

In some embodiments, the first magnet assembly includes three first magnets spaced at uniform intervals and arranged into an array. The first magnets have two kinds of first magnetic poles facing toward one side of the ribbon diaphragm. The two kinds of first magnetic poles are arranged alternately. The second magnet assembly includes three second magnets spaced at uniform intervals and arranged into an array. The second magnets have two kinds of second magnetic poles facing toward one side of the ribbon diaphragm. The two kinds of second magnetic poles are arranged alternately. The first magnetic pole and the second magnetic pole that correspond to each other are identical.

In some embodiments, the housing is provided with a through hole. The through hole is connected to the inside and the outside of the housing. The body passes through the through hole. The first part is arranged inside the housing. The second part is arranged outside the housing.

In some embodiments, the maximum magnetic energy product of the first magnet assembly and the second magnet assembly has a range of 43~53 megagauss-oersted (MGOe).

In some embodiments, a distance between the first magnet assembly and the ribbon diaphragm has a range of 0.2~0.3 mm and a distance between the second magnet assembly and the ribbon diaphragm has a range of 0.2~0.3 mm.

In some embodiments, the coil has a rectangular portion and a first protruding portion. One of the first connection portions is arranged on the rectangular portion and another of the first connection portions is arranged on the first protruding portions. The second connection portions of the flexible substrate are respectively and electrically connected to the rectangular portion and the first protruding portion of the coil.

In some embodiments, the first protruding portion of the coil is semicircular and the diameter of the first protruding portion ranges from 1.6 mm to 2.0 mm.

In some embodiments, the flexible substrate has a H-shaped portion and a second protruding portion. One of the second connection portions is arranged on the H-shaped portion and another of the second connection portions is arranged on the second protruding portion. The second connection portion on the H-shaped portion of the flexible substrate corresponds to the first connection portion on the first protruding portion of the coil. The second connection portion on the second protruding portion of the flexible substrate corresponds to the first connection portion on the rectangular portion of the coil.

Below, the embodiments are described in detail in cooperation with the drawings to make easily understood the technical contents, characteristics and accomplishments of the present invention.

DETAILED DESCRIPTION OF THE INVENTION

Figure 1:
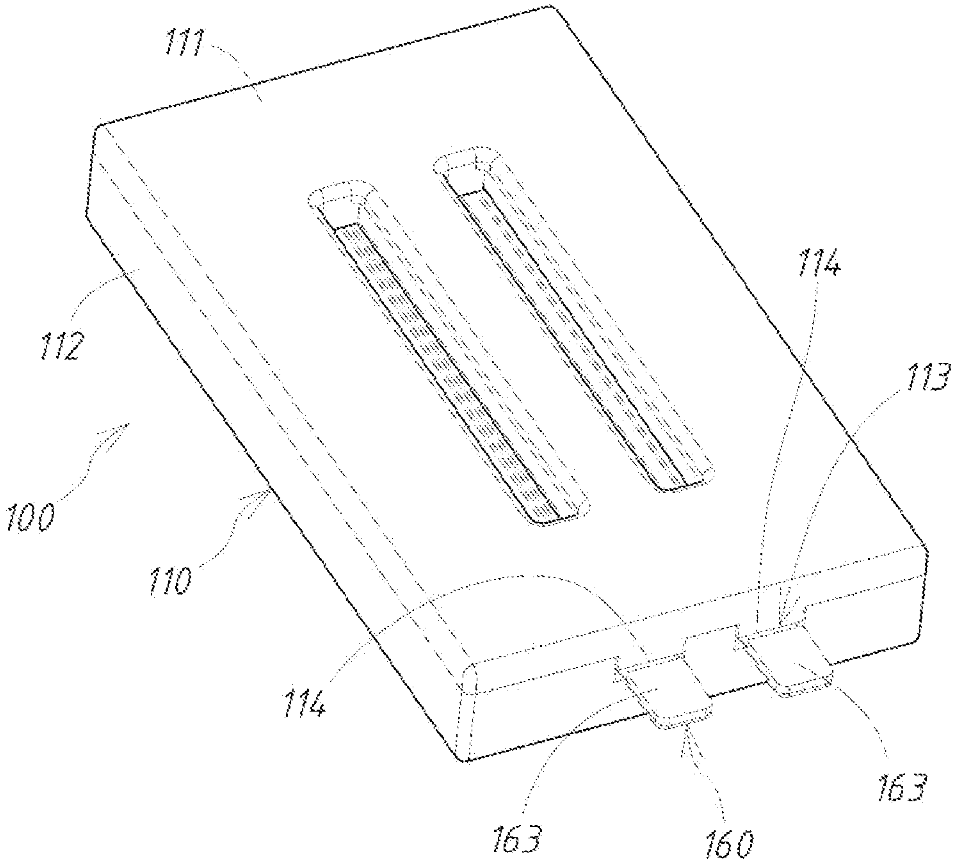
FIG. 1 is a perspective view of a ribbon speaker according to an embodiment of the present invention.

The present invention will be further described in detail below in conjunction with the drawings and examples. It can be understood that the specific embodiments described here are only used to explain the present invention, but not to limit the present invention. In addition, it should be noted that, only some but not all structures related to the present invention are shown in the drawings for convenience of description.

In the description of the present disclosure, unless otherwise expressly specified and limited, the term “connected to each other”, “connected”, or “fixed” is to be construed in a broad sense, for example, as securely connected, detachably connected, or integrated; mechanically connected or electrically connected; directly connected to each other or indirectly connected to each other through an intermediary; or internally connected or interactional between two components. For those of ordinary skill in the art, meanings of the preceding terms in the present disclosure may be construed based on situations.

In the present disclosure, unless otherwise expressly specified and limited, when a first feature is described as “above” or “below” a second feature, the first feature and the second feature may be in direct contact or be in contact through another feature between the two features. Moreover, when the first feature is described as “on”, “above”, or “over” the second feature, the first feature is right “on”, “above”, or “over” the second feature or the first feature is obliquely “on”, “above”, or “over” the second feature, or the first feature is simply at a higher level than the second feature. When the first feature is described as “under”, “below”, or “underneath” the second feature, the first feature right is “under”, “below”, or “underneath” the second feature or the first feature is obliquely “under”, “below”, or “underneath” the second feature, or the first feature is simply at a lower level than the second feature.

In the description of the present embodiment, the terms “up”, “down”, “left”, “right” and other orientation or position relationship are based on the orientation or position relationship shown in the drawings. The terms only facilitate the description and simplification of operation rather than indicate or imply that the referred means or elements must be structured and operated in a specific orientation. Therefore, the terms cannot be understood as the limitation of the present invention. In addition, the terms “first” and “second” are used only to distinguish between descriptions rather than have special meaning.

Figure 2:
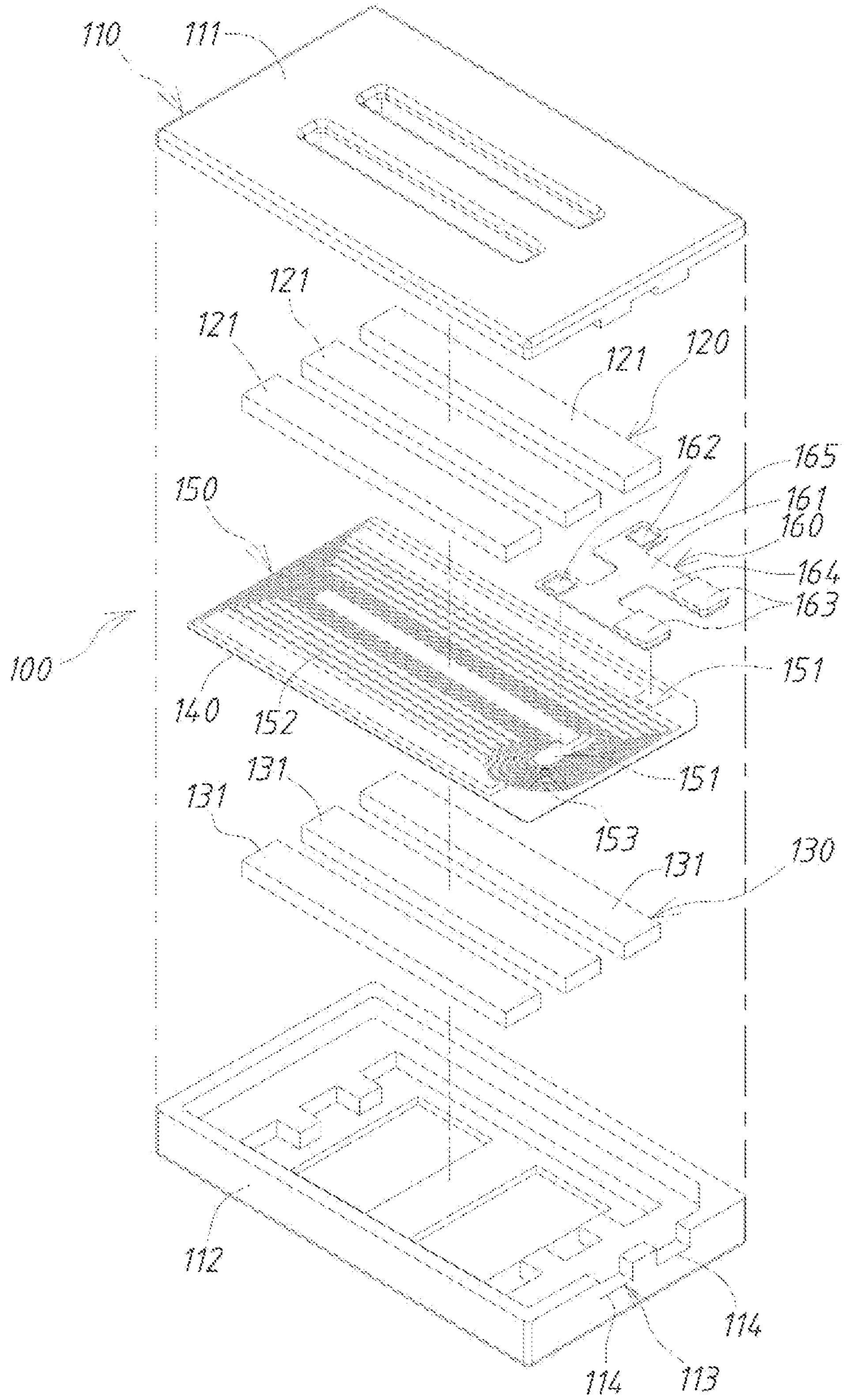
FIG. 2 is an exploded view of a ribbon speaker according to an embodiment of the present invention.
Figure 7:
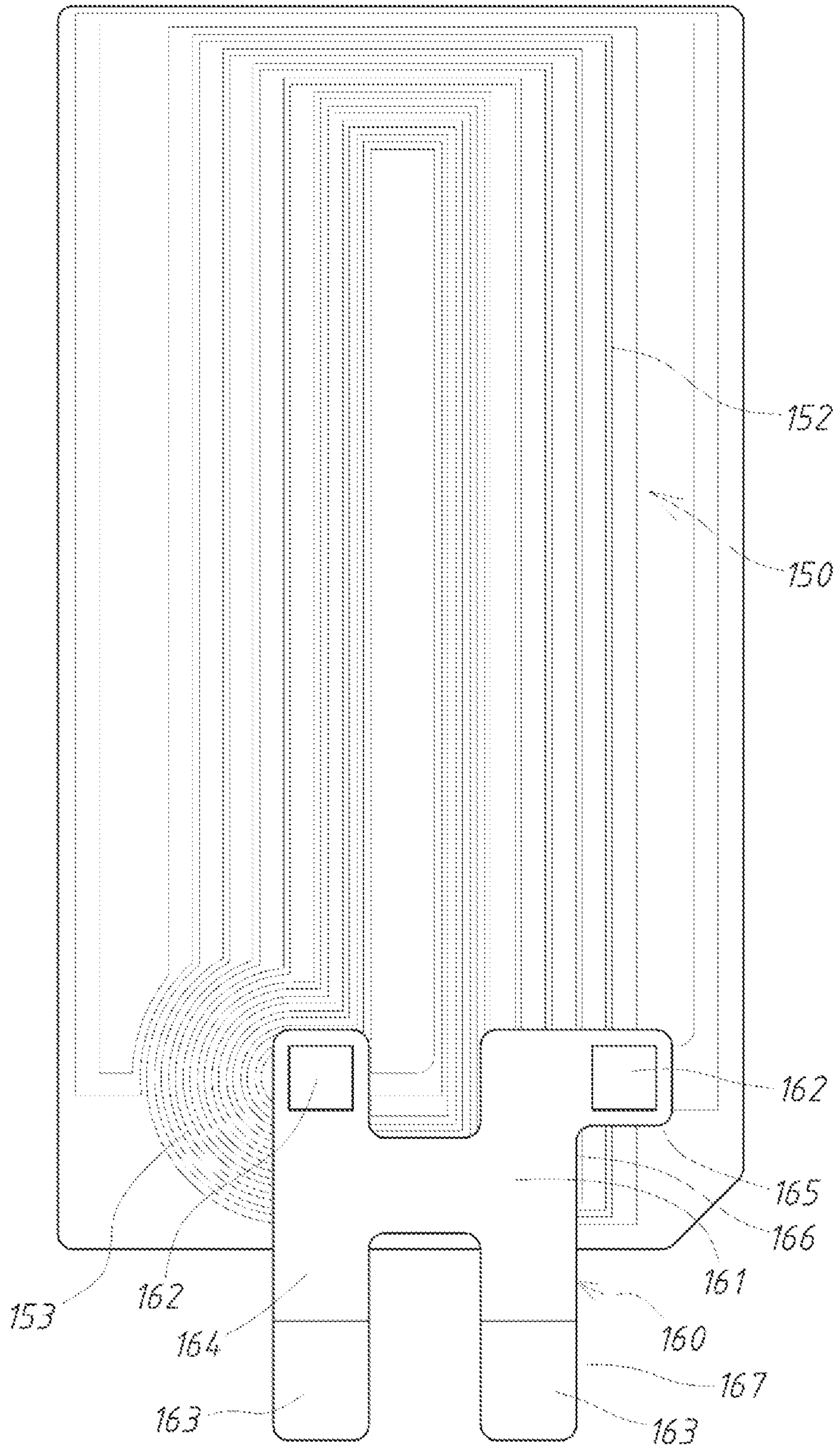
FIG. 7 is a top view of a ribbon diaphragm, a coil, and a flexible substrate according to an embodiment of the present invention.

Referring to FIG. 1 and FIG. 2, the present invention provides a ribbon speaker 100 that includes a housing 110, a first magnet assembly 120, a second magnet assembly 130, a ribbon diaphragm 140, a coil 150, and a flexible substrate 160. The first magnet assembly 120 is arranged in the housing 110. The second magnet assembly 130 is arranged in the housing 110. The same poles of the first magnet assembly 120 and the second magnet assembly 130 are arranged opposite to each other. The ribbon diaphragm 140 is arranged between the first magnet assembly 120 and the second magnet assembly 130. The coil 150, formed on the ribbon diaphragm 140, includes two first connection portions 151. Referring to FIG. 7, the flexible substrate 160 includes a body 161, two second connection portions 162, and two soldering portions 163. A first part 166 of the body 161 is arranged inside the housing 110 and a second part 167 of the body 161 is arranged outside the housing 110. The second connection portions 162 are arranged on the first part 166 of the body 161. The second connection portions 162 are respectively and electrically connected to the two first connection portions 151. The soldering portions 163 are arranged on the second part 167 of the body 161. The soldering portions 163 are respectively and electrically connected to the two second connection portions 162.

The advantage of the ribbon speaker 100 of the present invention is that the two soldering portions 163 of the flexible substrate 160 are arranged outside the housing 110 to reduce the soldering difficulty. Thus, the ribbon speaker 100 is more accurately and more rapidly produced. In addition, since the flexible substrate 160 abuts the ribbon diaphragm 140, the soldering height can be reduced to achieve a thinning purpose, which is helpful in miniaturizing the ribbon speaker 100. Thus, the ribbon speaker 100 has the advantages of lightweight, low power consumption, etc. and helps the development of mobile personal devices.

Furthermore, a horizontal plane is defined and the flexible substrate 160 is located on the horizontal plane. On the horizontal plane, the first part 166 extends to the outside of the housing 110 to form the second part 167 of the flexible substrate 160. On the horizontal plane, the soldering portion 163 of the flexible substrate 160 extends to the outside of the housing 110 in a direction away from the second connecting portion 162, thereby reducing the soldering difficulty. It is worth mentioning that, as illustrated in FIG. 1, in some embodiments, the soldering portions 163 of the flexible substrate 160 protrude from the same side of the housing 110. In other embodiments, the soldering portions 163 of the flexible substrate 160 may also protrude from another side of the housing 110 (not shown in the drawing).

Figure 3:
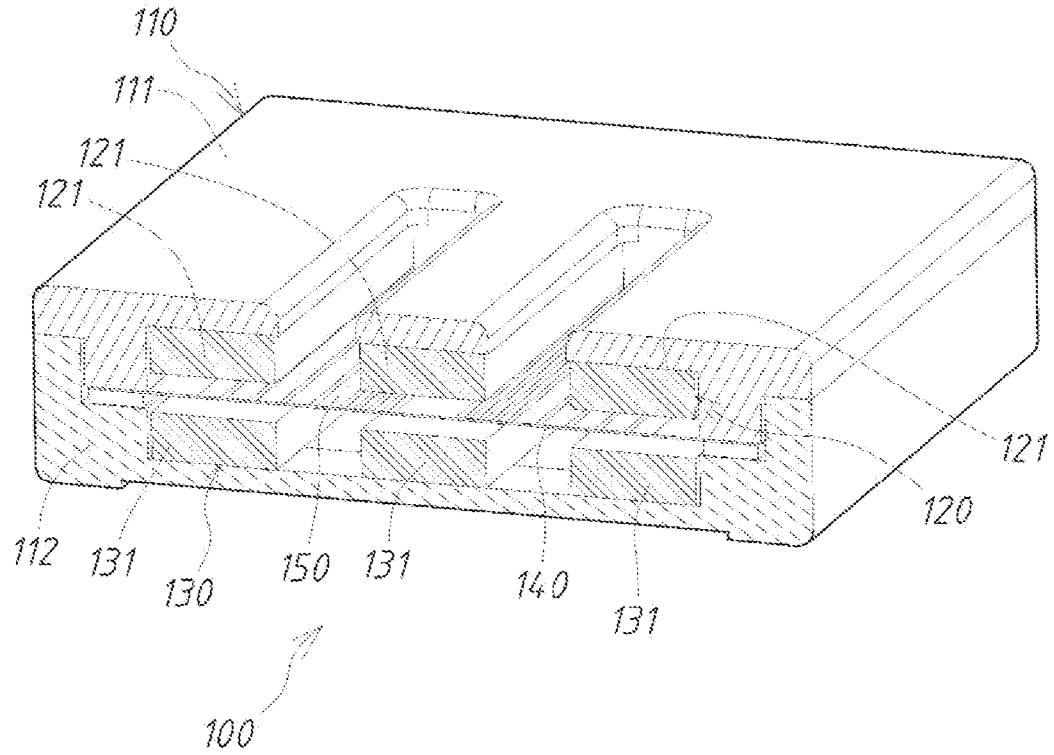
FIG. 3 is a cross-sectional view of a ribbon speaker according to an embodiment of the present invention.

Refer to FIG. 3. In some embodiments, the housing 110 includes a first cover 111 and a second cover 112 connected to the first cover 111. The first cover 111 and the second cover 112 are mutually snap-connectable or detachable. The first magnet assembly 120 is arranged on the first cover 111. The second magnet assembly 130 is arranged on the second cover 112.

In some embodiment, the housing 110 is provided with a through hole 113. The through hole 113 is connected to the inside and the outside of the housing 110. The body 161 of the flexible substrate 160 passes through the through hole 113. Thus, the first part 166 of the body 161 is arranged inside the housing 110. The second part 167 of the body 161 is arranged outside the housing 110. The through hole 113 is defined and surrounded by the first cover 111 and the second cover 112. The first part 166 and the second part 167 of the flexible substrate 160 are respectively arranged inside and outside the through hole 113 of the housing 110.

Moreover, the through hole 113 has two electrical connection holes 114 are defined and surrounded by the first cover 111 and the second cover 112. The body 161 of the flexible substrate 160 passes through the electrical connection holes 114, such that the first part 166 and the second part 167 of the body 161 are respectively arranged inside and outside the electrical connection hole 114. It is worth mentioning that the through hole 113 may have one electrical connection hole 114. The soldering portions 163 extend from the body 161 to the outside of the housing 110 through the same electrical connection hole 114 (not shown in the drawing).

In some embodiments, the ribbon diaphragm 140 is arranged on the horizontal plane. On the horizontal plane, the two soldering portions 163 of the flexible substrate 160 extend to the outside of the housing 110 in a direction away from the ribbon diaphragm 140.

Figure 4:
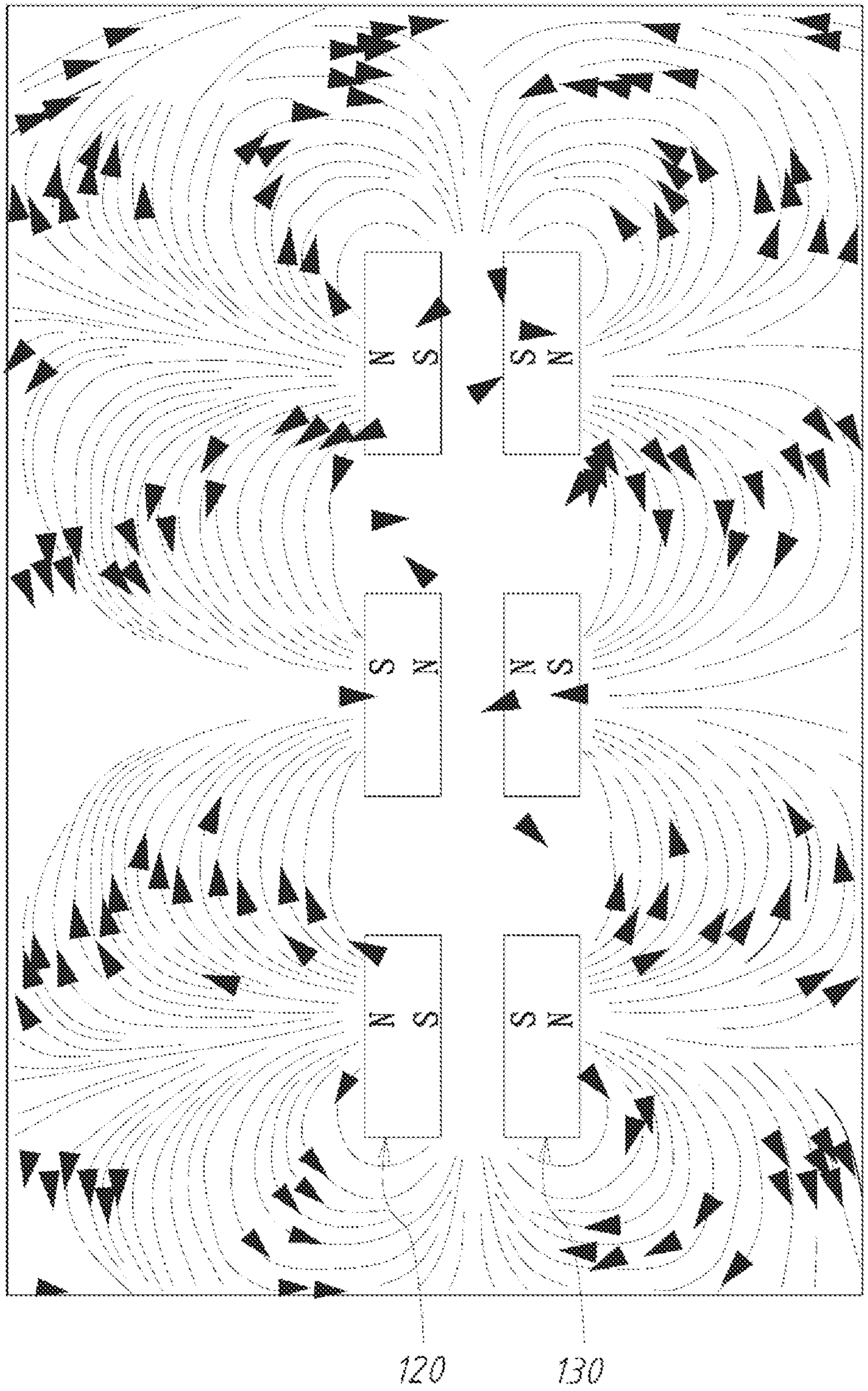
FIG. 4 is a schematic diagram illustrating the magnetic line of force of a ribbon speaker according to an embodiment of the present invention.

Refer to FIG. 3 and FIG. 4. In some embodiments, the first magnet assembly 120 includes three first magnets 121 spaced at uniform intervals and arranged into an array. The first magnets 121 have two kinds of first magnetic poles facing toward one side of the ribbon diaphragm 140. The two kinds of first magnetic poles are arranged alternately. The second magnet assembly 130 includes three second magnets 131 spaced at uniform intervals and arranged into an array. The second magnets 131 have two kinds of second magnetic poles facing toward one side of the ribbon diaphragm 140. The two kinds of second magnetic poles are arranged alternately. The first magnetic pole and the second magnetic pole that correspond to each other are identical. The first magnets 12, having shapes of strips, are arranged on the first cover 111. The middle first magnet 121 on the first cover 111 has an S pole and the first magnets 121 on both sides have N poles. The middle first magnet 121 facing toward the ribbon diaphragm 140 has an N pole and the first magnets 121 on both sides have S poles. The second magnets 13, having shapes of strips, are arranged on the second cover 112. The middle second magnet 131 on the second cover 112 has an S pole and the second magnets 131 on both sides have N poles. The middle second magnet 131 facing toward the ribbon diaphragm 140 has an N pole and the second magnets 131 on both sides have S poles.

It is worth mentioning that, in other embodiments, the number and magnetic arrangement of the first magnet assembly 120 and the second magnet assembly 130 can also be changed according to requirements. In addition, the first magnet assembly 120 and the second magnet assembly 130 may also be arranged on the housing 110.

Figure 5:
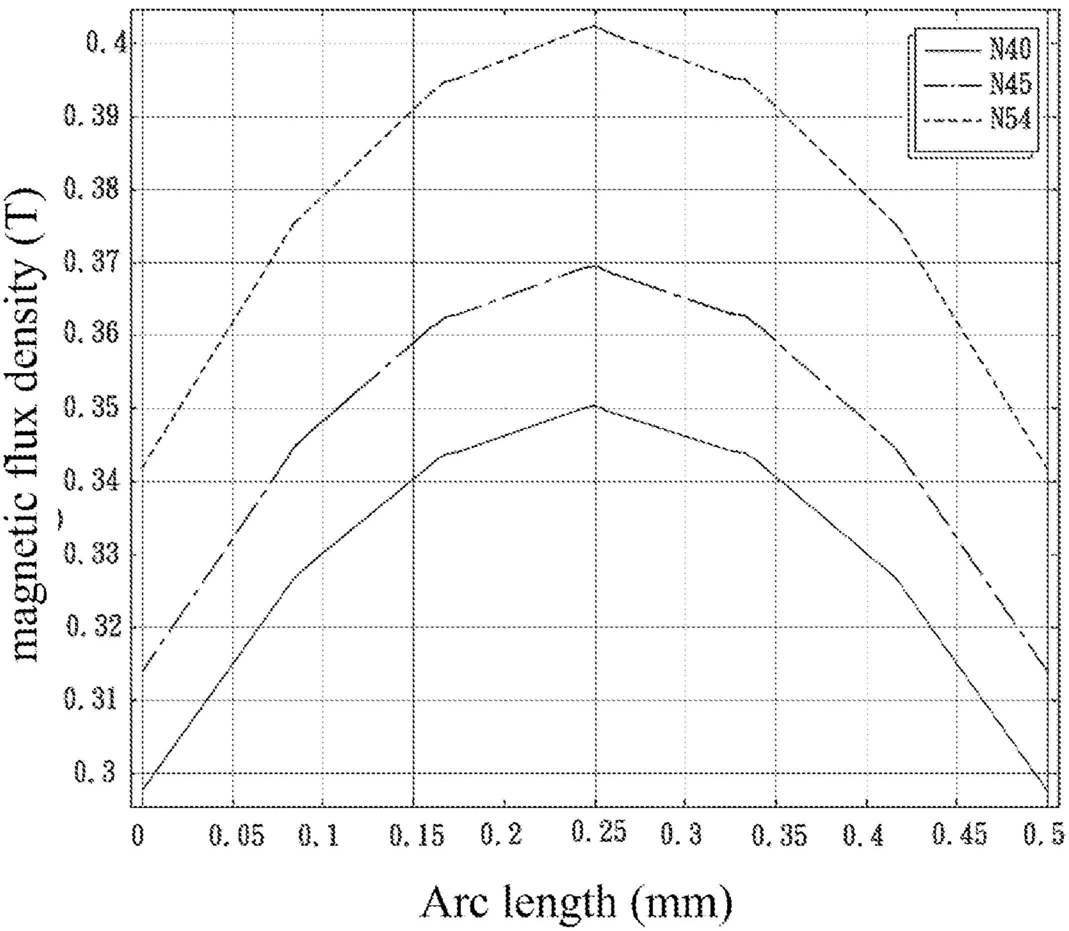
FIG. 5 is a graph of magnetic flux density using different grades of magnets according to an embodiment of the present invention.

Refer to FIG. 5. In some embodiments, the magnet grade of the first magnet assembly 120 and the second magnet assembly 130 has a range of N43~N53. The maximum magnetic energy product ($BH_{max}$) of the first magnet assembly and the second magnet assembly has a range of 43~53 megagauss-oersted (MGOe). The first magnet assembly 120 and the second magnet assembly 130 are made of NdFeB. Each of the first magnet 121 and the second magnet 131 has a length of 12 mm, a width of 1.6 mm, and a height of 0.6 mm. As illustrated in FIG. 5, the magnet grade of the first magnet assembly 120 and the second magnet assembly 130 is N40, N45, or N54. When different magnets are used, the magnetic flux density (Tesla, T) in the gap is measured. It can be found that the magnetic flux density at 0.25 mm in the middle of the gap is highest. Therefore, 0.25 mm is an optimal distance between the first magnet assembly 120 and each of the ribbon diaphragm 140 and the coil 150. An optimal distance between the second magnet assembly 130 and each of the ribbon diaphragm 140 and the coil 150 is also 0.25 mm.

In some embodiments, a distance between the ribbon diaphragm 140 and the first magnet assembly 120 has a range of 0.2~0.3 mm. A distance between the ribbon diaphragm 140 and the second magnet assembly 130 has a range of 0.2~0.3 mm, preferably 0.25 mm.

The ribbon diaphragm 140 includes polyethylene terephthalate (PET, Mylar), polyethylene naphthalate (PEN), poly-4,4'-oxydiphenylene-pyromellitimide (ODPA-PMDA, Kapton), a three-layer soft composite structure formed by metal foils such as gluing copper and aluminum, or a two-layer soft composite structure formed by ODPA-PMDA directly bonded to metal foils such as copper and aluminum.

Figure 6:
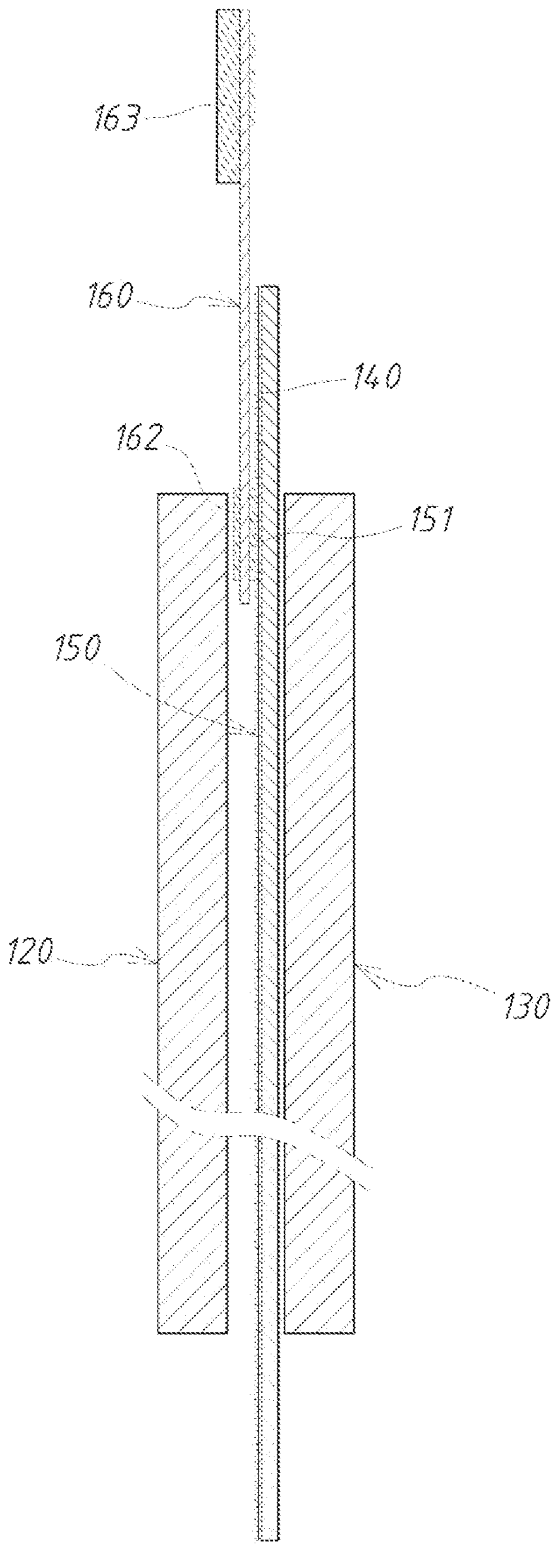
FIG. 6 is a side view of a partial component of a ribbon speaker according to an embodiment of the present invention.

Refer to FIG. 6 and FIG. 7. In some embodiments, the coil 150 has a rectangular portion 152 and a first protruding portion 153. One of the first connection portions 151 is arranged on the rectangular portion 152 and another of the first connection portions 151 is arranged on the first protruding portions 153. The second connection portions 162 of the flexible substrate 160 are respectively and electrically connected to the rectangular portion 152 and the first protruding portion 153 of the coil 150. The area of the ribbon diaphragm 140 corresponding to the rectangular portion 152 of the coil 150 is mainly used to produce sound.

The flexible substrate 160 has a H-shaped portion 164 and a second protruding portion 165. One of the second connection portions 162 is arranged on the H-shaped portion 164 and another of the second connection portions 162 is arranged on the second protruding portion 165.

Furthermore, the second connection portion 162 on the H-shaped portion 164 of the flexible substrate 160 corresponds to the first connection portion 151 on the first protruding portion 153 of the coil 150. The second connection portion 162 on the second protruding portion 165 of the flexible substrate 160 corresponds to the first connection portion 151 on the rectangular portion 152 of the coil 150.

Figure 8:
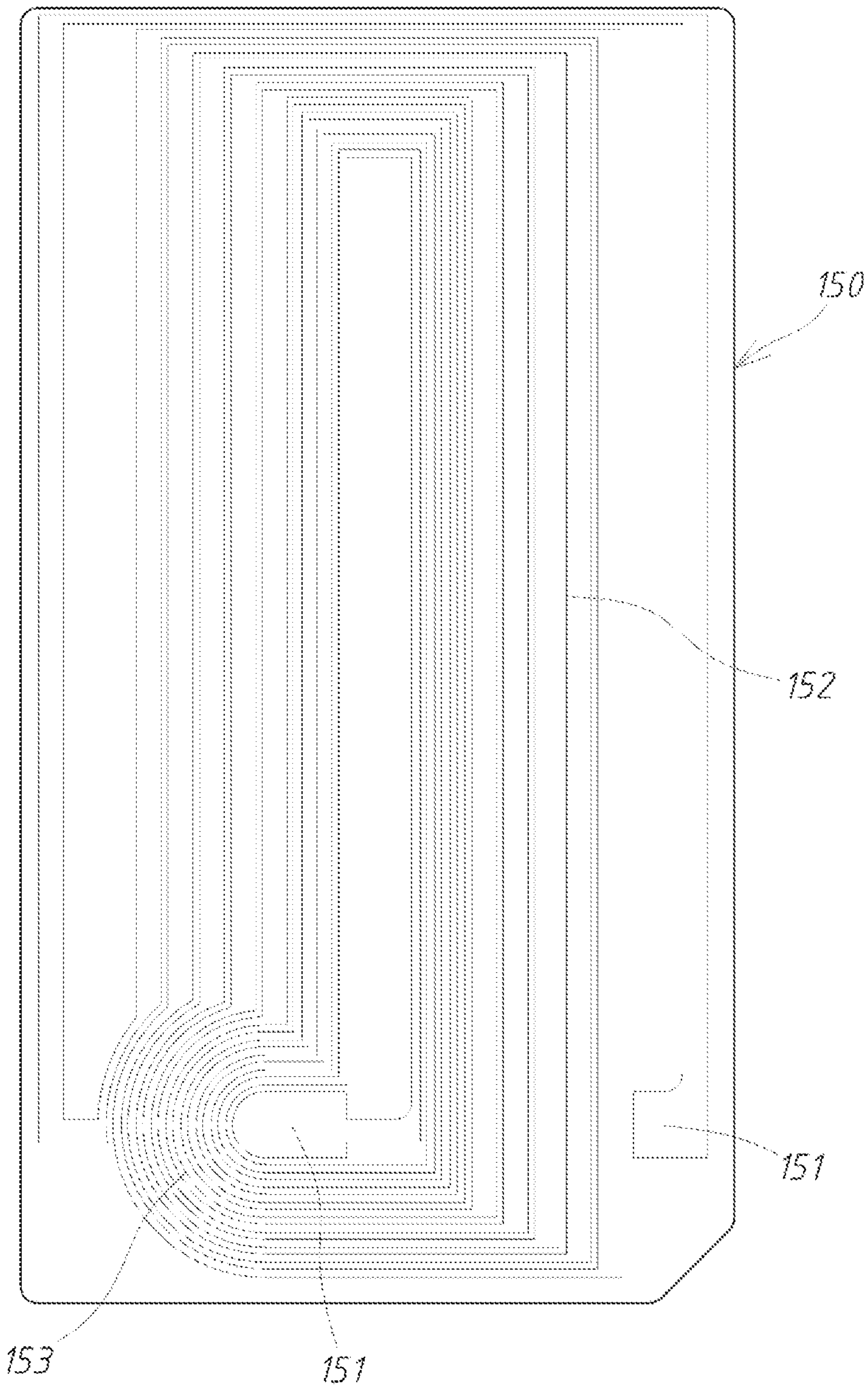
FIG. 8 is a top view of a ribbon diaphragm and a coil according to an embodiment of the present invention.

Refer to FIG. 7 & FIG. 8. The first connection portion 151 of the coil 150 and the second connection portion 162 of the flexible substrate 160 are welded each other to form an electrical connection. The first protruding portion 153 of the coil 150 and the second protruding portion 165 of the flexible substrate 160 protrude in order to increase the soldering area, thereby improving the product yield of the ribbon speaker 100. It is worth mentioning that, in other embodiments, the coil 150 and the flexible substrate 160 can also have other shapes. The shapes of the coil 150 and the flexible substrate 160 that can increase the soldering area are also included within the scope of the present invention.

Further explanation is that the first protruding portion 153 of the coil 150 is semicircular and that the diameter of the first protruding portion 153 ranges from 1.6 mm to 2.0 mm.

Figure 9:
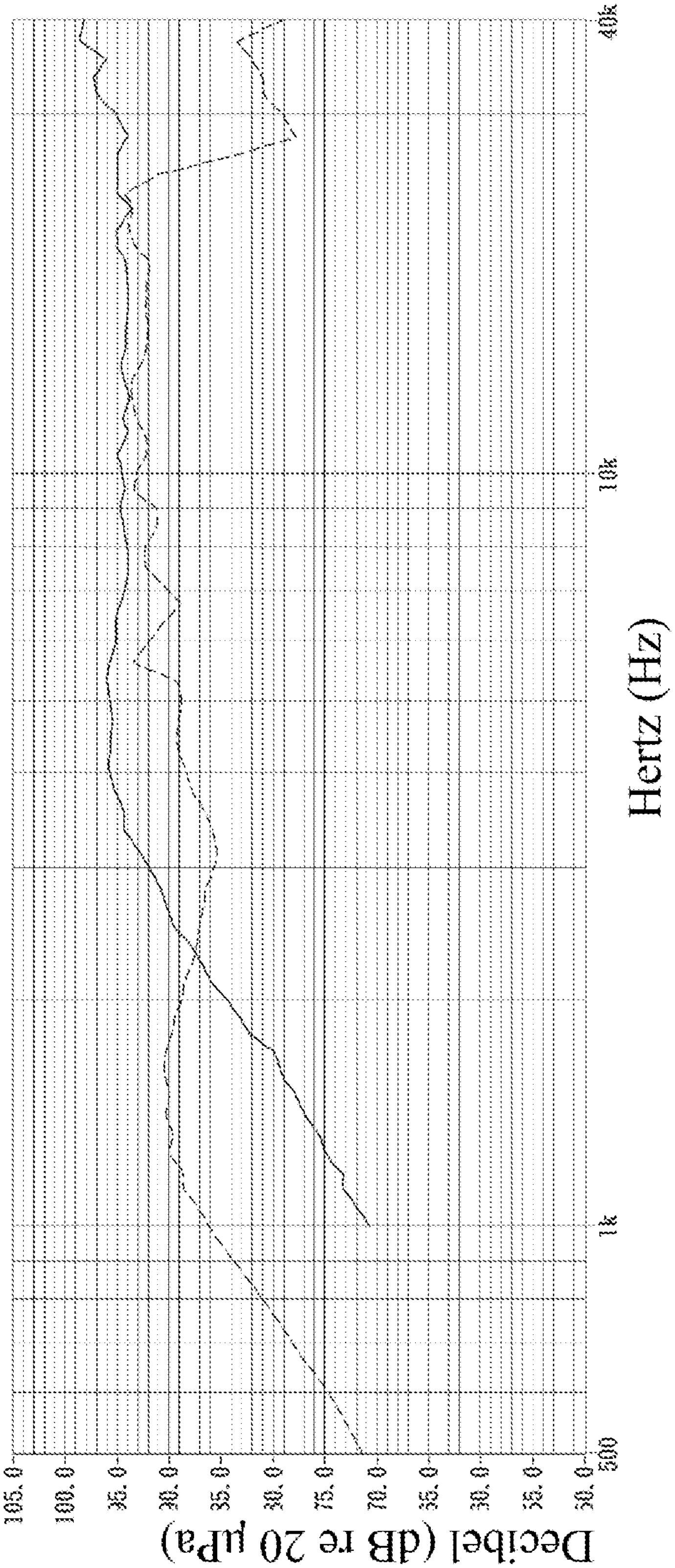
FIG. 9 is a graph of the test data of a ribbon speaker according to an embodiment of the present invention

Refer to FIG. 9. FIG. 9 shows a solid line that represents the test data of the ribbon speaker 100 according to some embodiments. FIG. 9 shows a dashed line that represents the test data of a traditional moving coil loudspeaker driver. It can be seen that the volume performance of the present invention is better in the high-frequency range.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A ribbon speaker comprising:

a housing;

a first magnet assembly arranged in the housing;

a second magnet assembly arranged in the housing, wherein same poles of the first magnet assembly and the second magnet assembly are arranged opposite to each other;

a ribbon diaphragm arranged between the first magnet assembly and the second magnet assembly;

a coil, formed on the ribbon diaphragm, comprising two first connection portions; and a flexible substrate comprising:

a body whose first part is arranged inside the housing, and a second part of the body is arranged outside the housing, two second connection portions arranged on the first part of the body, wherein the second connection portions are respectively and electrically connected to the two first connection portions, and two soldering portions arranged on the second part of the body, wherein the soldering portions are respectively and electrically connected to the two second connection portions;

wherein the housing comprises a first cover and a second cover, the first cover and the second cover are mutually snap-connectable or detachable, the first magnet assembly is arranged on the first cover, and the second magnet assembly is arranged on the second cover;

wherein the first magnet assembly includes three first magnets spaced at uniform intervals and arranged into an array, the first magnets have two kinds of first magnetic poles facing toward one side of the ribbon diaphragm, and the two kinds of first magnetic poles are arranged alternately;

wherein the second magnet assembly includes three second magnets spaced at uniform intervals and arranged into an array, the second magnets have two kinds of second magnetic poles facing toward one side of the ribbon diaphragm, and the two kinds of second magnetic poles are arranged alternately; and wherein the first magnetic pole and the second magnetic pole that correspond to each other are identical.

2. The ribbon speaker according to claim 1, wherein the housing is provided with a through hole, the through hole is connected to an inside and an outside of the housing, the body passes through the through hole, the first part is arranged inside the housing, and the second part is arranged outside the housing.

3. The ribbon speaker according to claim 1, wherein a maximum magnetic energy product of the first magnet assembly and the second magnet assembly has a range of 43~53 megagauss-oersted (MGOe).

4. The ribbon speaker according to claim 1, wherein a distance between the first magnet assembly and the ribbon diaphragm has a range of 0.2~0.3 mm and a distance between the second magnet assembly and the ribbon diaphragm has a range of 0.2~0.3 mm.

5. The ribbon speaker according to claim 1, wherein the coil has a rectangular portion and a first protruding portion, one of the first connection portions is arranged on the rectangular portion, another of the first connection portions is arranged on the first protruding portions, and the second connection portions of the flexible substrate are respectively and electrically connected to the rectangular portion and the first protruding portion of the coil.

6. The ribbon speaker according to claim 5, wherein the first protruding portion of the coil is semicircular and a diameter of the first protruding portion ranges from 1.6 mm to 2.0 mm.

7. The ribbon speaker according to claim 5, wherein the flexible substrate has a H-shaped portion and a second protruding portion, one of the second connection portions is arranged on the H-shaped portion, another of the second connection portions is arranged on the second protruding portion, the second connection portion on the H-shaped portion of the flexible substrate corresponds to the first connection portion on the first protruding portion of the coil, and the second connection portion on the second protruding portion of the flexible substrate corresponds to the first connection portion on the rectangular portion of the coil.

* * * * *